3,284,888
METHOD AND APPARATUS FOR ASSEMBLING AND ERECTING A ROCKET OR MISSILE
Walter J. McClain and George S. Jenkins, Tampa, Fla., assignors to Edward J. Donnelly, Charles B. Allen, John J. Jenkins, Jr., and George S. Jenkins, a partnership, doing business as J. E. Greiner Company, Baltimore, Md.
Filed May 9, 1963, Ser. No. 279,105
33 Claims. (Cl. 29—407)

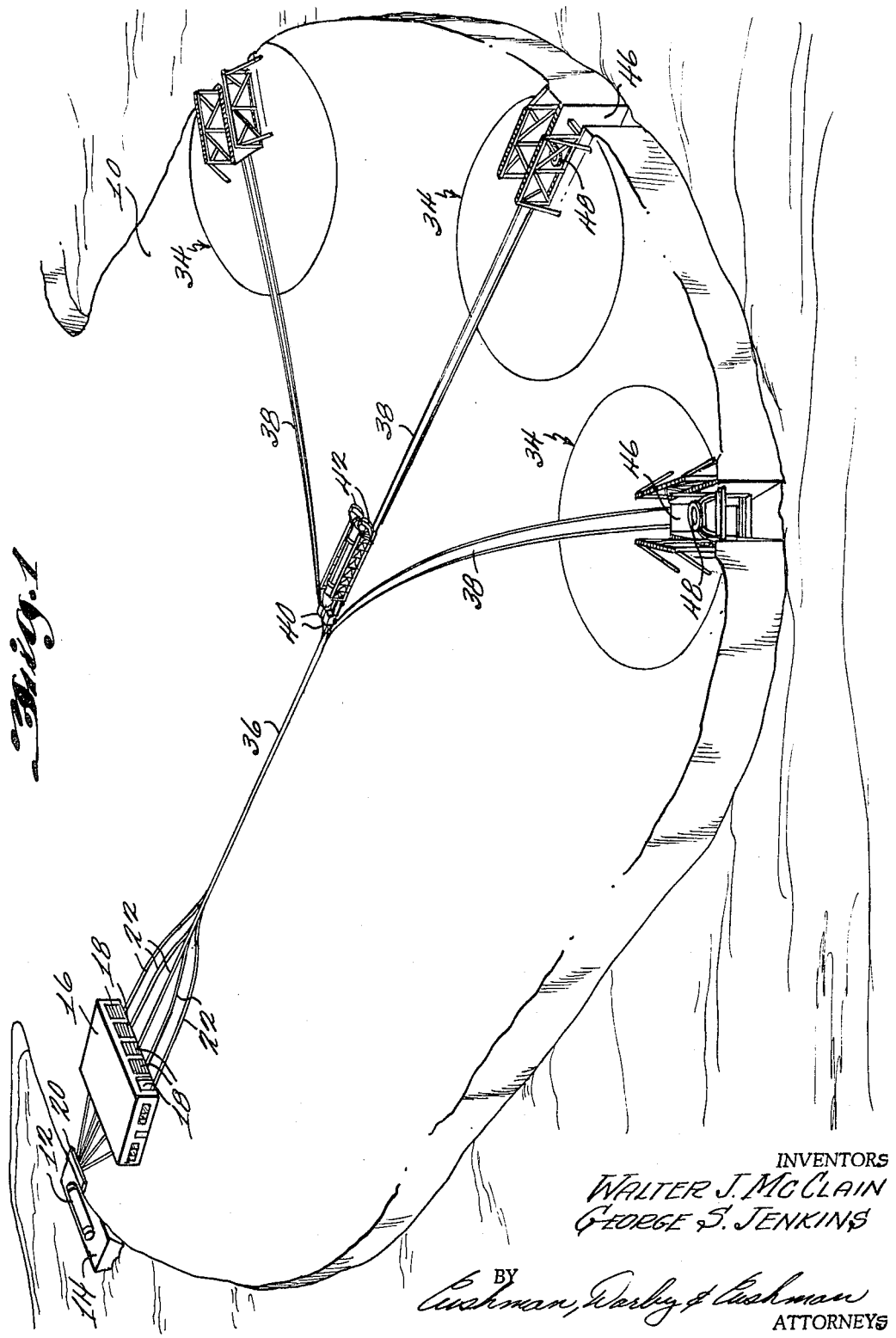

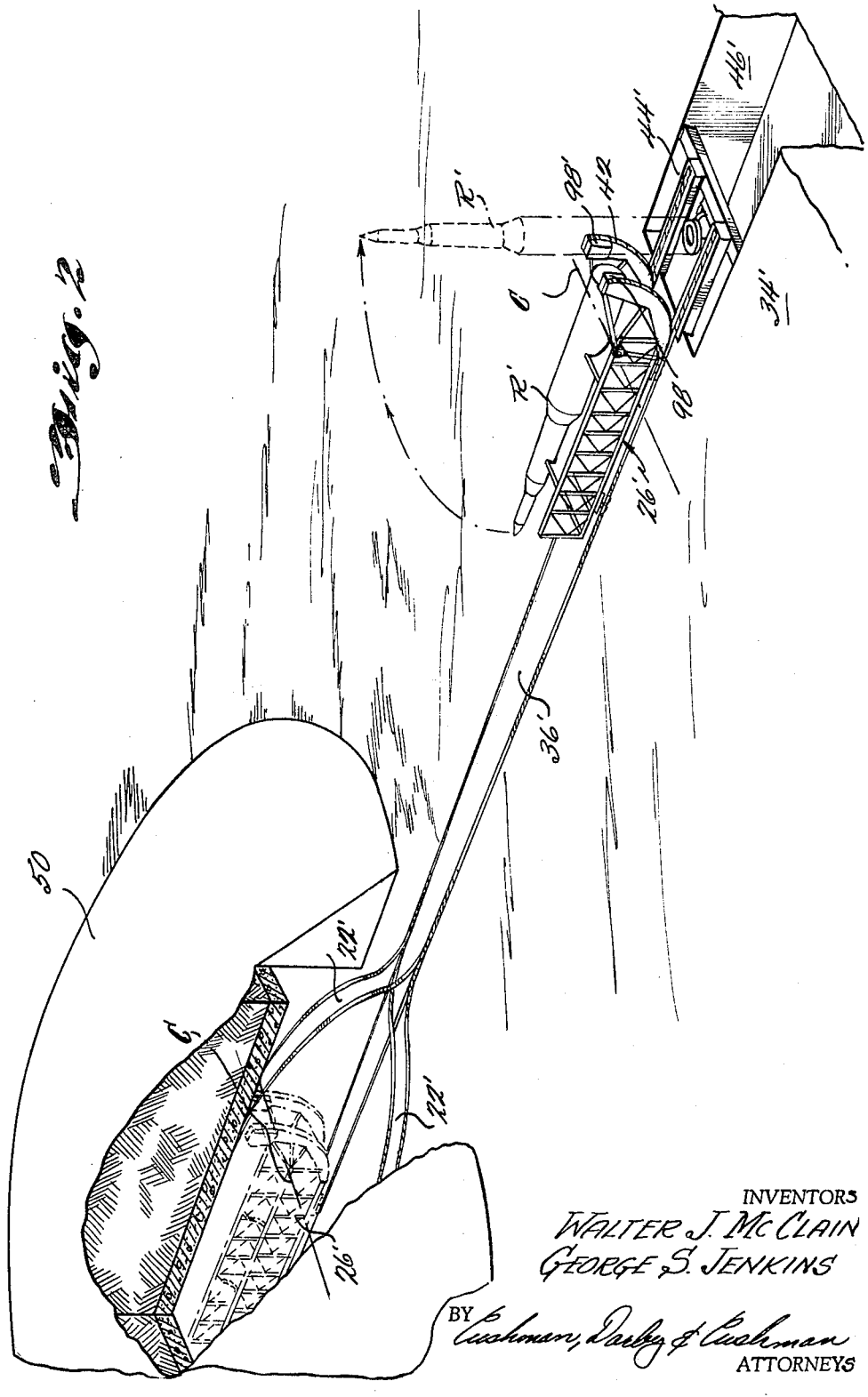

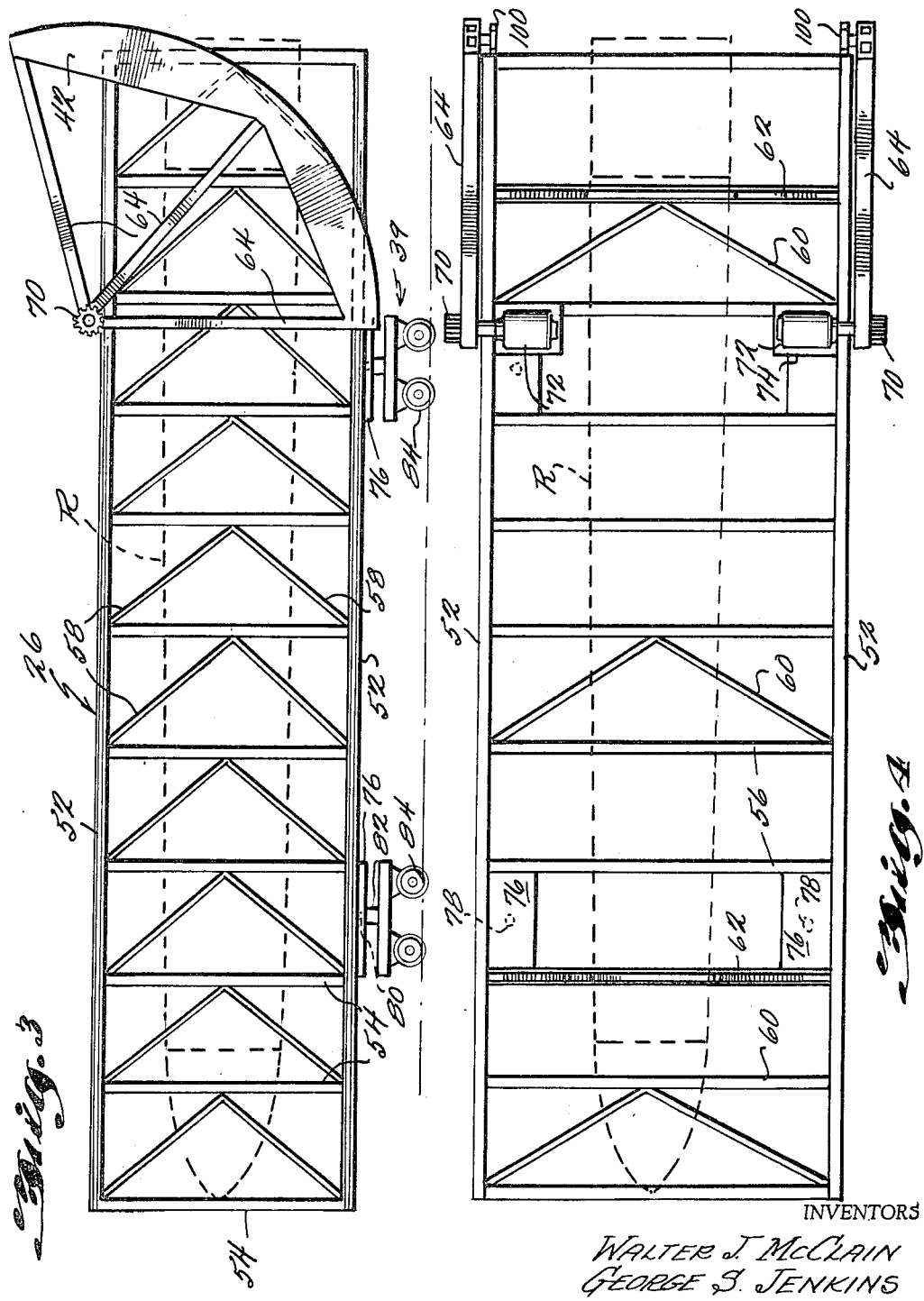

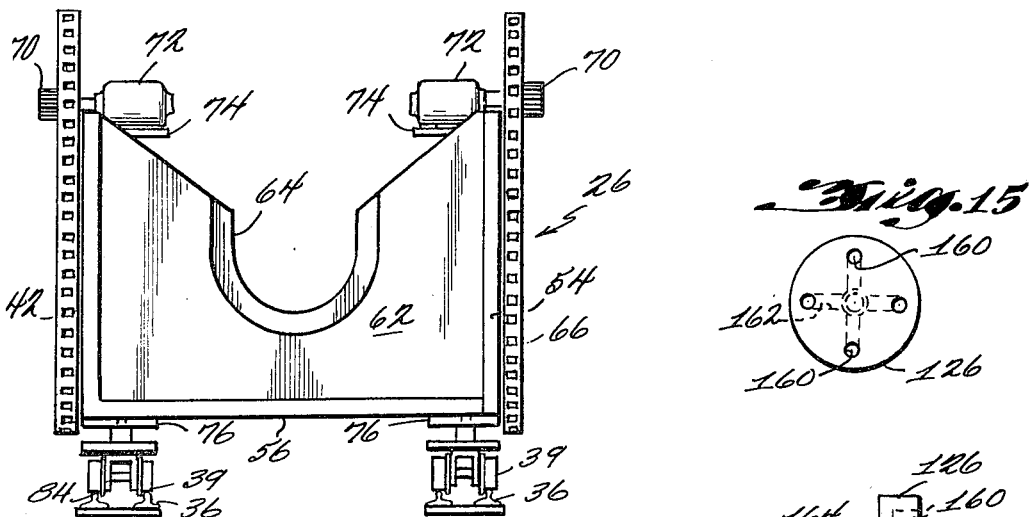
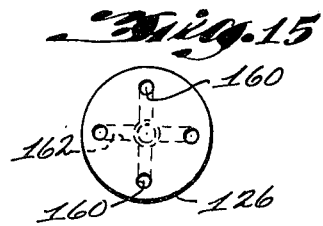
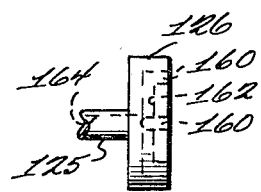
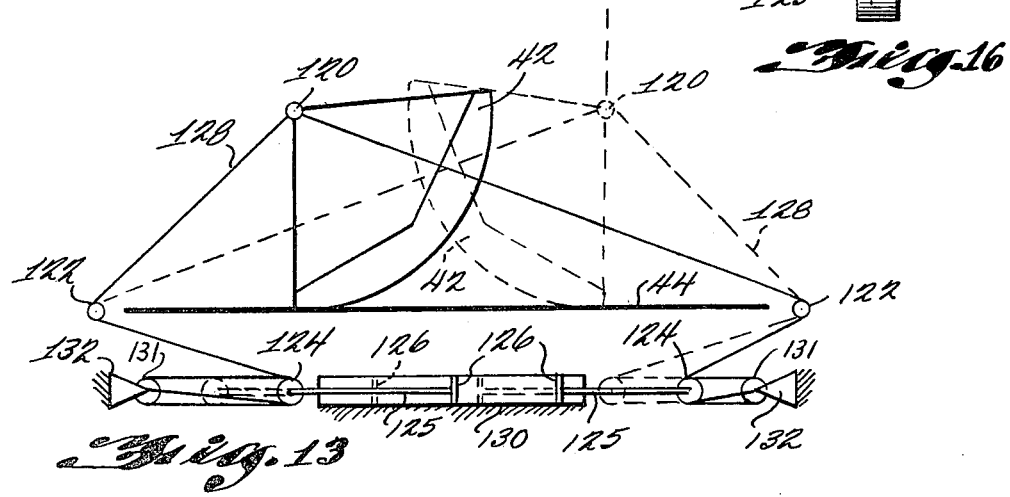
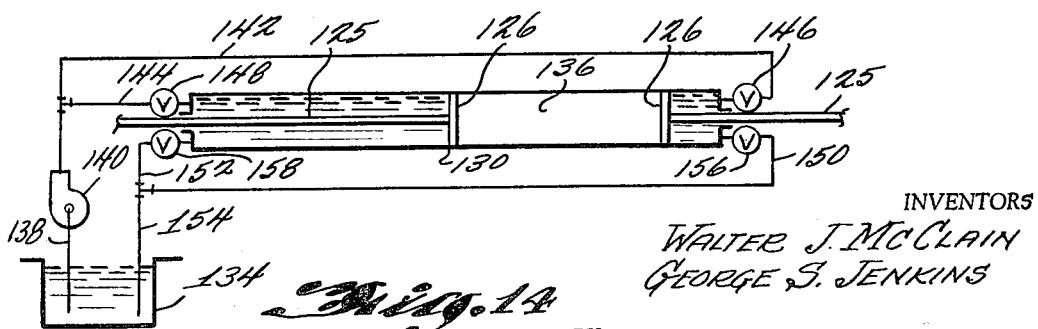

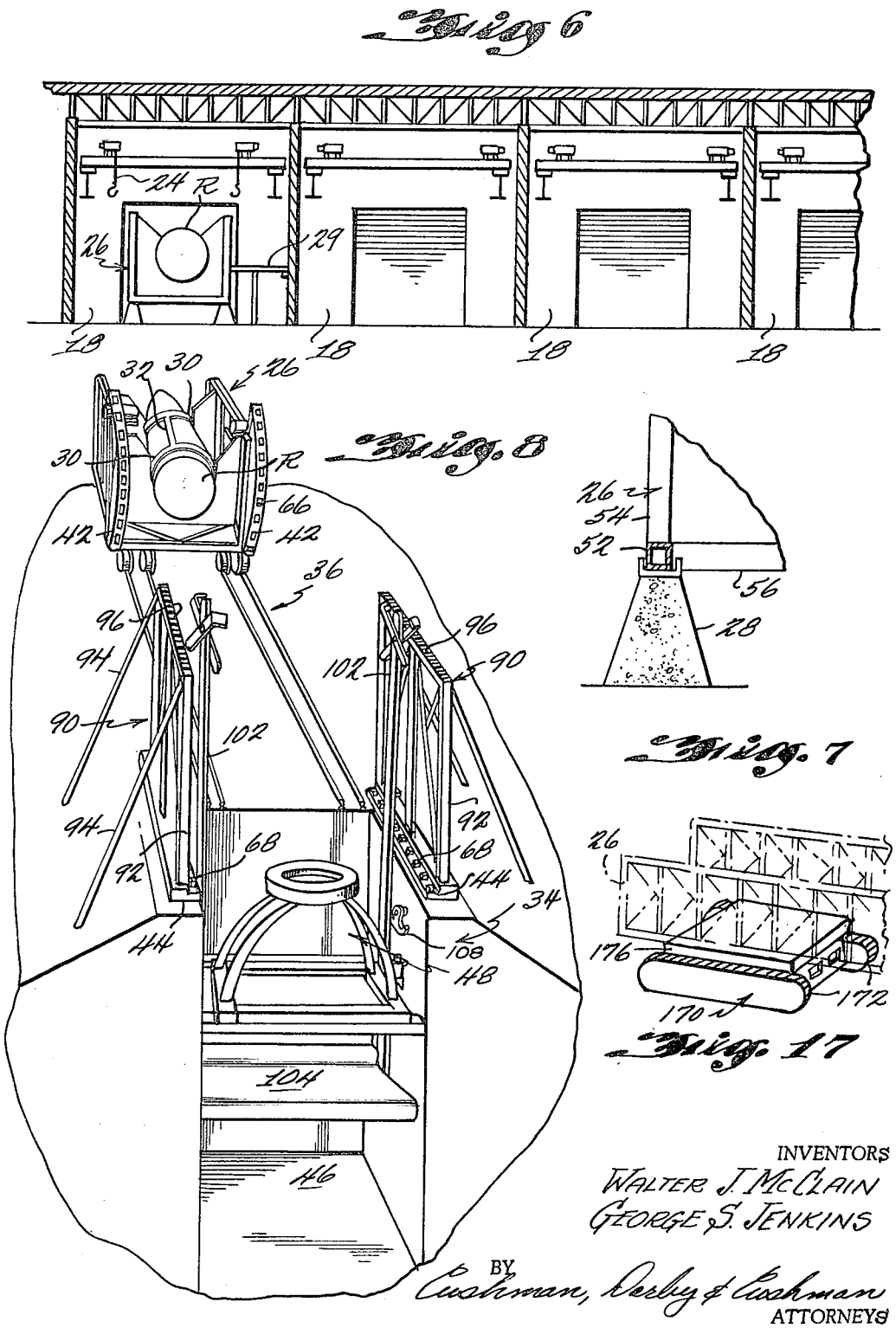

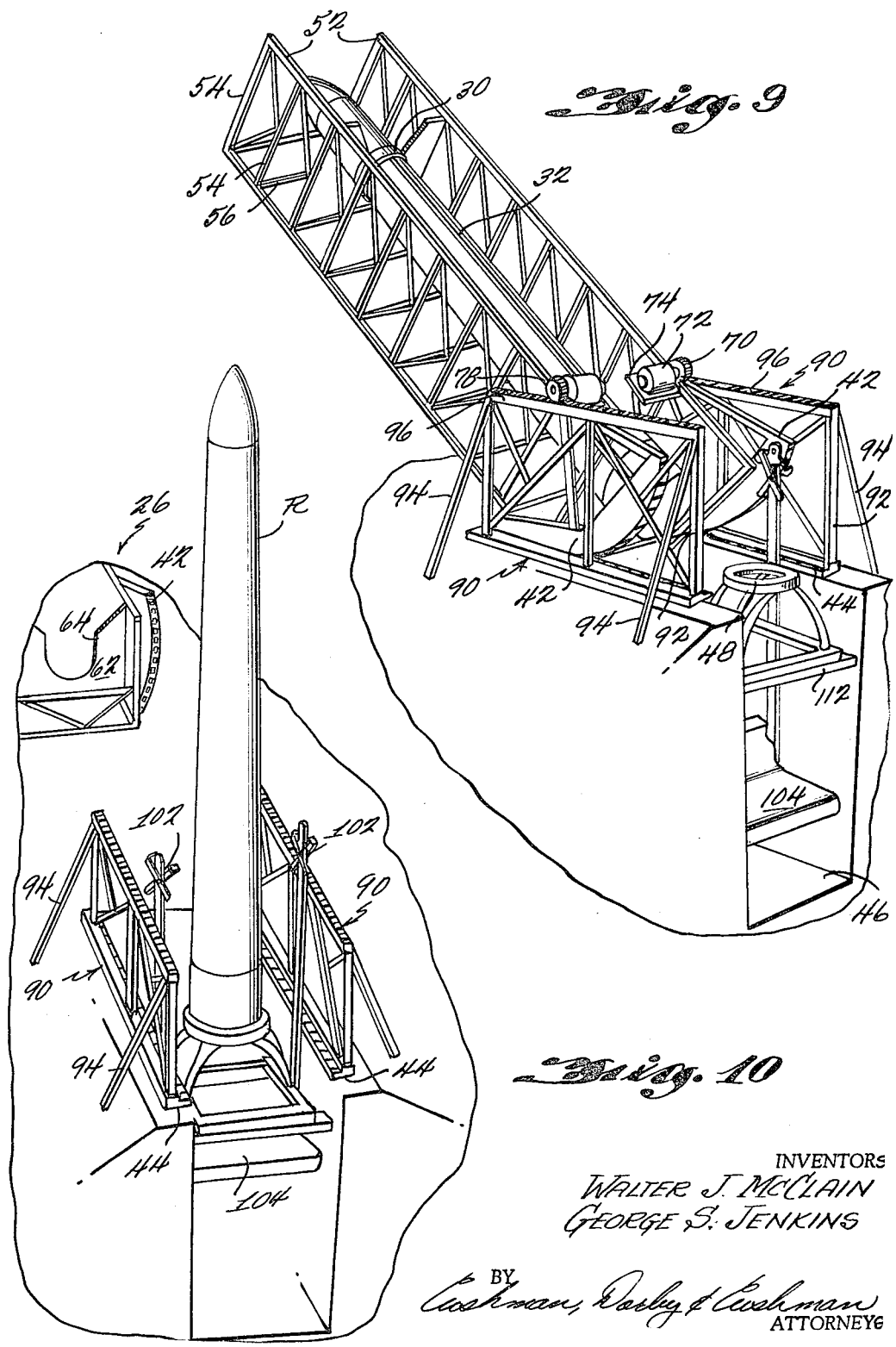

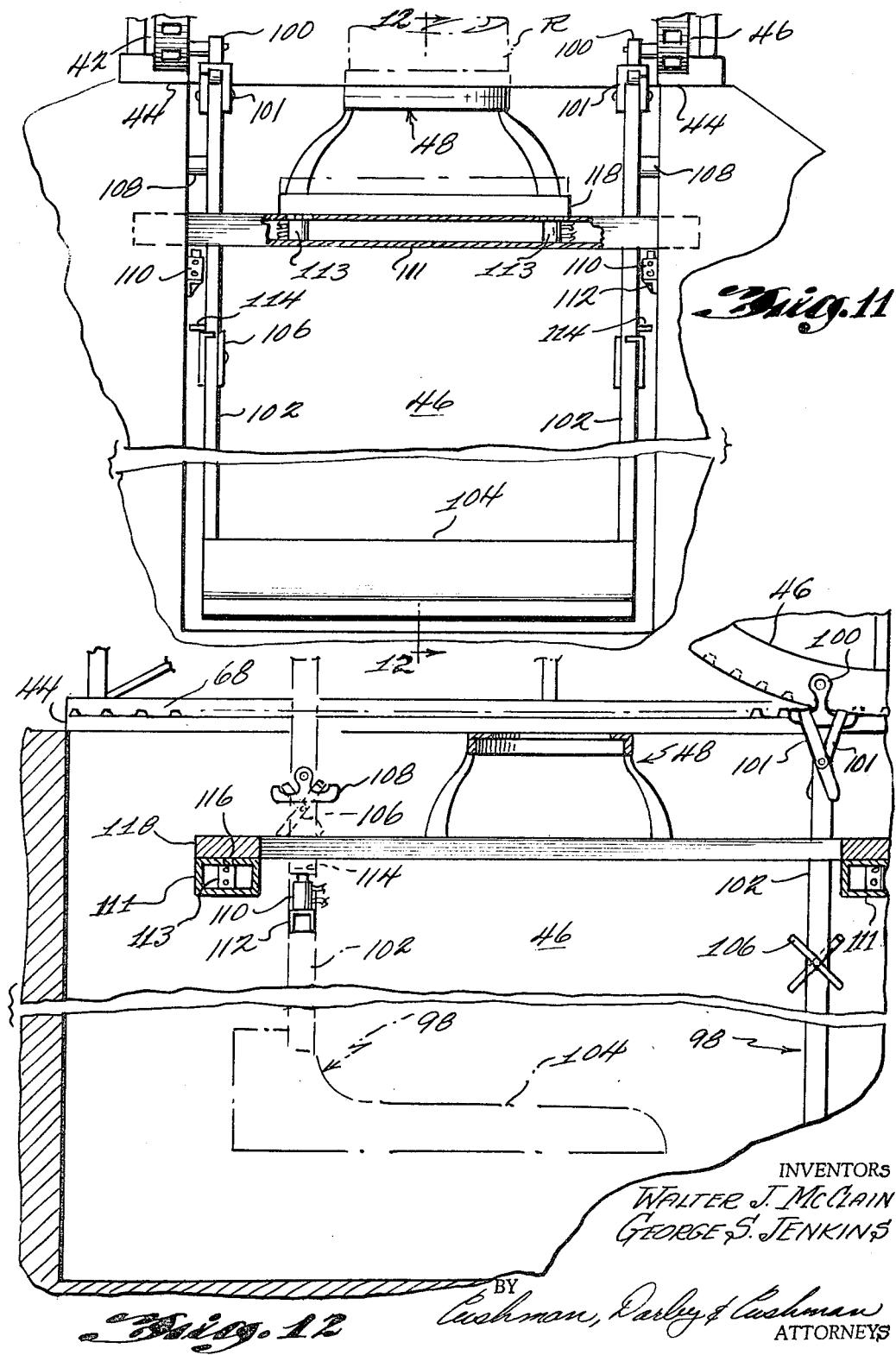

The present invention relates to a method and a system for erecting rockets or missiles at a launch site or the like and, more particularly, to a method and system in which the rockets or missiles may be assembled from component parts in a horizontal position and supported on carriers at a site remote from the launch site and then transported to the launch site while still in a horizontal position and then erected to a vertical position as a unit at the launch site.

The term "rocket or missile" as used throughout the specification is intended to cover any space vehicle fired from a launch site in a substantially vertical position. The rocket or missile may be used as an operational weapon or it may be used to launch space capsules into space flights or orbits.

Heretofore, the launching of large rockets or missiles necessitated the assembly of the component parts of the rocket or missile at the launch site. The various stages of the rockets or missiles had to be assembled from the bottom upward requiring time-consuming vertical transportation of men and materials. After the rocket or missile had been assembled on the launch pad in the vertical position, there was still the additional problem of checking out the rocket or missile and fueling and arming the same. This again was a slow process as it required time-consuming vertical transportation of men and test equipment in the arming tower.

Such a heretofore operation limited the use of a particular launch pad to the time required for cleanup after launching, plus the additional time for assembling another rocket or missile from the bottom upwardly and then checking this rocket or missile out prior to firing. This operation would take four weeks or more to complete.

It has been proposed to assemble a number of these rockets or missiles in a vertical position in a building having vertical cells for each missile and then transporting the missile vertically from the building to the launch site and onto the launch pad. Such an arrangement involves a tremendous expense and is an exceedingly dangerous operation. First, a costly building must be erected which is at least as tall as the length of the rocket or missile. Even after the building is erected, there is still a time delay in erecting the rocket or missile from the bottom upwardly in the cells and, thus, the actual assembly time of the rocket or missile is not reduced materially.

Also, the transporting of the rocket or missile to the launch site from the building would involve considerable danger in that the speed of movement of a carrier would become a factor because of the instability of the rocket or missile during transportation in weather and winds. For example, it would be impractical to move the vertical positioned rocket or missile horizontally when there is any amount of wind or there would be a chance of lightning striking the rocket or missile in case of a storm as the same would be projecting upwardly above all other structures in the area and would become, in effect, a lightning rod. Numerous lightning rods would have to be installed along the path of travel of the rocket or missile from the assembly site to the launch site and these lightning rods would have to be higher than the rocket or missile to be effective. Since present day rockets or missiles are of 200 feet in length and it is expected within a short period of time that the rockets or missiles will have lengths of 600 feet or more, such a mode of assembly, transportation to and erection of the rockets or missiles on the launch pad becomes highly difficult and impractical.

A primary object of the present invention is to provide a method and system whereby rockets or missiles may be assembled from component parts in a horizontal position at a site remote from the launch site and then transferred by a mobile carrier to the launch site with the carrier being utilized to erect the rocket or missile in a vertical position on the launch pad and more particularly on the support mount of the launch pad.

Another object of the present invention is to provide a method and a system where the rocket or missile is assembled in the carrier at a remote site from the launching site, the rocket or missile being assembled in a horizontal position and having all of its electric, electronic, hydraulic, fuel and oxidizer systems etc. checked out while in the carrier prior to its erection to a vertical position on the launch pad in order that all that is necessary to launch the rocket or missile after erection is to umbilical and fuel the rocket or missile. Ancillary to the immediately preceding object, the rocket or missile could be fueled while in the horizontal position depending upon the particular type of fuel used.

Still another object of the present invention is to provide a method and a system in which there can be repetitive launch of a rocket or missile from a launch pad in a minimum amount of time. Ancillary to the immediately preceding object, it is a further object of the present invention to provide a method and system wherein a plurality of rockets or missiles can be assembled on a plurality of mobile carriers at a site remote from the launch site, each of the rockets or missiles being fully checked out while in a horizontal position in the carriers and then transported to the launch pad and made ready for launch with other rockets or missiles being brought to the pad for erection as soon as the first rocket or missile is fired.

A further object of the preset invention is to provide a mobile carrier for rockets or missiles in which the rockets or missiles are supported in a horizontal position and thus have a low center of gravity during transportation and, thus, inherently stable in transit. Ancillary to the preceding object, it is a further object of the present invention to utilize a means of transportation for the rocket or missile wherein the same is grounded through the means of transportation so that the necessity for lightning arresters or rods is unnecessary.

Another object of the present invention is to provide a method and system wherein a rocket or missile may be assembled from component parts from either end or from both ends simultaneously, thus eliminating the necessity of consecutive vertical assembly of elements from the bottom upward.

In many of the missile sites now in use for missiles such as the "Minuteman" and the "Titan II," the missiles are erected in deep underground silos in a vertical position. The silos are provided with doors which open up when the missile is fired. Such silos beneath the surface of the earth are 150 feet deep and the cost of building such installations is tremendous. The utility of the installations is limited to the number of missiles which are vertically positioned in the silos. In other words, after the missiles are fired from the silos, there is a long period of time before additional missiles can be erected vertically in the silos to again make the missile site operational.

It is a further object of the present invention to provide a method and system wherein a plurality of rockets or missiles can be individually stored in a horizontal position on mobile carriers in a site such as a bunker or cave or other structure above ground, the rockets or missiles being transported by the mobile carriers in a horizontal position to a launch site wherein the carrier is used to erect the missile in a vertical position on the support mount of the launch pad. By such an operation, there can be repetitive launching of rockets or missiles from the same launch pad in a short period of time, especially since the rockets or missiles can be completely checked out while in their stored horizontal position on the mobile carrier.

A further object of the present invention is to provide a method and system for repetitive launching of rockets or missiles from a launch site, the missiles being stored above ground in a protected storage site and moved in a horizontal position to the launch pad as needed and erected vertically as a unit for launching. Such a method and system of erection for launching results in substantial savings in the cost of installation as costly excavation of sites below the surface of the earth is eliminated. Also, such missile sites can accommodate a greater number of missiles and utilize a launch pad more effectively for repetitive launching of rockets or missiles.

A further object of the present invention is to provide a mobile carrier in which rockets or missiles may be assembled therein from component parts and/or stored in a horizontal position, the carrier being capable of rapidly transporting the missile horizontally to a launch site and then used as a means to raise or erect the missile to a vertical position at the launch site.

Ancillary to the preceding object, it is a further object of the present invention to provide such a carrier with a removable counterweight structure which may be capable of use as a flame deflector when the rocket or missile is fired.

These and other objects and advantages of the present invention will appear more fully in the following specification, claims and drawings in which:

FIGURE 1 is a schematic perspective view of the system and method of operation wherein the rocket or missile is assembled in the carrier in a horizontal position and moved to the launch site where it is erected vertically for launching;

FIGURE 2 is a schematic perspective view disclosing another modified use of the method and system wherein the rockets or missiles may be stored in a protective site in carriers ready for transportation to and erection at a launch pad;

FIGURE 3 is an enlarged side elevational view of a carrier used either for assembly and/or storage of a rocket or missile in the horizontal position, the carrier being shown with railway trucks supporting the same;

FIGURE 4 is a top plan view of the carrier illustrated in FIGURE 3;

FIGURE 5 is an end elevational view of the carrier looking from the right of FIGURE 3;

FIGURE 6 is a fragmentary front elevational view of an assembly building wherein the rockets or missiles are assembled and/or checked out prior to launching;

FIGURE 7 is an enlarged fragmentary view illustrating a carrier supported on a pedestal within the assembly building;

FIGURE 8 is a perspective view illustrating a carrier mounted on a railway track structure and moving toward the launch pad with the rocket or missile supported horizontally therein;

FIGURE 9 is a perspective view illustrating a further step in the sequence of operation of the method and system of the present invention and disclosing the carrier erecting the rocket or missile toward the vertical position;

FIGURE 10 is another perspective view in the sequence of operation of the present invention illustrating the rocket or missile vertically positioned on the support mount and with the mobile carrier moving away from the launch pad;

FIGURE 11 is a view partly in elevation and partly in section illustrating the rocket or missile positioned on the support mount and the counterweight attached to the segmental girders of the carrier;

FIGURE 12 is a view taken substantially on the line 12—12 of FIGURE 11 but also illustrating schematically the position of the counterweight when fixedly supported to the walls of the pit at the launch pad and in a position to act as a flame shield for a rocket or missile fired from the launch pad;

FIGURE 13 is a schematic view of a modified cable drive for rolling the carrier with the missile therein from the horizontal to the vertical position;

FIGURE 14 is a schematic view of the hydraulic system for operating the cable drive shown in FIGURE 13;

FIGURE 15 is an enlarged end view of a piston for the hydraulic cylinder of FIGURE 14;

FIGURE 16 is a side elevation view of the piston shown in FIGURE 14; and

FIGURE 17 is a perspective view of a modified means for use with the carrier to transport the same to a launch site.

Referring now to the drawings wherein like character or reference numerals represent like or similar parts and in particular to FIGURE 1 of the drawings, there is disclosed a typical complex for the assembly of a rocket or missile, transportation of the same to a launch site, and the erection of the same at the launch site in accordance with the present invention.

In more detail, the complex may be built on a cape or suitable peninsula 10 in order that large component parts 12 of a rocket or missile may be easily transported to the site by means of a barge 14 from the place of fabrication. Since present day rockets or missiles have lengths ranging from 200 to 600 feet or more, the fabricated component parts are necessarily large and it has been found more practical to transport the various large component parts by water on large barges rather than by land conveyances such as railway flatcars or trucks wherein tunnels, bridges and the like provide obstacles. However, the complex shown in FIGURE 1 as being constructed on a cape or peninsula 10 is merely for illustrative purposes, it being understood that the means of transporting the component parts of the rocket or missile to the site of assembly does not form part of the present invention.

An assembly building 16 having a plurality of horizontally extending bays 18 is situated near unloading docks 20 in order that the component parts of the rocket or missile may be easily transported into the building for assembly. The elongated horizontally extending bays 18 may be opened at both ends in order that spur lines 22 of a railway track structure 36 can extend therethrough. Suitable door closures not shown may be provided at each end of the bays 18. The assembly building 16 is provided in each bay with suitable overhead traveling cranes or hoists 24 for handling component parts of the rocket or missile during assembly. A mobile carrier generally designated at 26 is moved into a particular bay 18 on one of the spur lines 22 and then is fixedly positioned on support pedestals 28 (FIGURE 7) so that the carrier may have a solid foundation during the assembly of the rocket or missile. The rocket or missile is then assembled in the truss-like structure of the mobile carrier 26 from the component parts by either assembling the rocket or missile from either end toward the other end or by assembling the rocket or missile toward both ends simultaneously. By assembling the rocket or missile horizontally, the assembly time can be considerably shortened as multiple crews can simultaneously work on different sections of the same. This is a preferable mode of assembly in accordance with the present invention. Suitable work platforms 29 are provided in each of the bays 18 and the carrier 26 as disclosed, is a truss-like structure which is also provided with additional work platforms for use in the vertical or horizontal position to assist in the assembly and check out of the component parts of the rocket or missile. It is to be noted that in the vicinity of the assembly building a launch pit 46 could be provided for testing to put a carrier 26 in an elevated position between horizontal and vertical.

After the rocket or missile R has been completely assembled in a horizontal position within the carrier 26, the check-out procedure for the rocket or missile R may be started. All systems for the rocket or missile R may be checked out while the rocket or missile is horizontally supported on the carrier 26 and in certain instances the rocket or missile may even be fueled while supported in the carrier. The test equipment for checking out of rockets or missiles may be suitably supported within compartments provided in the truss structure of the carrier 26.

While the check-out procedure for the rocket or missile is being accomplished, the rocket or missile R is firmly secured in the carrier 26 by means of suitable detachable and adjustable girth support rings 30 and longerons 32 extending therebetween. The rocket or missile R is then ready for vertical erection at one of the launch pads generally designated at 34, the launch pads 34 being usually located several miles away from the assembly building 16. Suitable track structure 36 connected to the spur lines 22 extend to additional spur lines 38 which lead to the various launch pads 34. The carrier 26 with the rocket or missile R detachably supported therein is then elevated off of the pedestal 28 and onto its railway type support trucks 39 (FIGURE 3) and yard engines 40 are run in behind railway type trucks 39 on opposite sides of the carrier to push the carrier toward the launch pad 34. Forms of motive power other than the yard engines 40 may be used, for example, the railway type trucks 39 of the carrier may have self-contained motive power units, if desired.

The carrier 26 is provided at its end supporting the base portion of the rocket or missile R with segmental girders 42 which are adapted to cooperate with fixed tread plates 44 positioned on either side of a launching pit 46 at the launch pad 34. Suitably supported within the launching pit 46 is a vertically movable support mount 48 for supporting the rocket or missile R in a vertical position. When the carrier 26 reaches the launch pad 34 and its segmental arches 42 engage the tread plates 44, further forward movement of the carrier toward the pit 46 will cause an upwardly rolling action of the carrier about one end on the segmental girders 42 until such time that the rocket or missile R is in a vertical position over the pit 46. When this has been accomplished, the support mount 48 is elevated sufficiently to engage the bottom or the base of the rocket or missile R to support the weight of the same. The rocket or missile now supported on the support mount 48 is ready to be umbilicaled, fueled and armed. Then the girth ring 30 and longerons 32 are released and the carrier 26 is rolled backwardly and downwardly onto its railway trucks 39 and transported away from the launch pad back into the bay 18 of the assembly building 16 where it is positioned ready for the assembly of another unit.

Referring now to FIGURE 2, a slightly modified use of the present invention is disclosed. In the complex shown in FIGURE 2, rockets or missiles R' are stored and checked out while positioned horizontally in carriers 26', the carriers with the rockets or missiles R' thereon being positioned in a sheltered site such as a bunker or cave 50. The rockets or missiles R' illustrated in FIGURE 2 are of the type used as weapons rather than the type used for space shots to launch space capsules. Track structure spur lines 22' within the bunker 50 lead into a central track structure 36' which extends to a launch pad 34'. While only one pad 34' is shown, there could be a number of pads having spur lines leading thereto from the track structure 36'. The carrier 26' is moved from a particular spur line 22' of track structure 36 to the launch pad 34' and is rolled upwardly until the rocket or missile R' is in a vertical position above the support mount (not shown), as previously described. The rocket or missile R' is then disconnected from the carrier 26' and the carrier is lowered and removed from the launch pad 34' so that the rocket or missile can be fired.

It will be understood that as soon as the rocket or missile is fired, another carrier 26' from the bunker 50 can be rolled into position and its rocket or missile R' erected on the same pad 34' with a minimum of elapsed time. The complex shown in FIGURE 2 eliminates the need of large underground silos having vertical cells therein with individual launch pads for supporting a rocket or missile for launching during the course of a conflict. A more detailed description of the structural differences of the carrier 26' from that of the carrier 26 will follow later in the specification.

In both FIGURES 1 and 2, arming facilities have been omitted for purposes of clarity; however, it may be understood that the carriers 26 or 26' may, if desired, be equipped with suitable work platforms and work spaces thereon and equipment therein whereby they could be used to arm the rockets or missiles.

Referring now in detail to FIGURES 3, 4, and 5, the carrier 26 is a truss structure which includes a pair of sides each formed by upper and lower longitudinally extending structural members 52 connected together by a plurality of vertically extending side members 54. The opposite sides of the truss structure are connected together by cross members 56 at the base. Suitable bracing members 58 may be provided between adjacent members 54 and top or bottom members 52 to give the truss structure of the carrier more rigidity. Likewise, bracing members 60 are provided between adjacent cross members 56 and the two bottom structural members 52. The carrier 26 is provided at spaced longitudinal points along its length with transversely extending plate-like rocket or missile support members 62, each having an open upwardly facing rocket or missile-receiving cutout 64, as best shown in FIGURE 5. The transversely extending plate-like support members 62 may be utilized to detachably connect the girth rings 30 when it is desired to secure a rocket or missile in position during transportation and/or erection. As shown in the drawings, two transversely extending support members 62 are provided but it will be understood that any desired number may be provided depending upon the length and the weight of the rocket or missile supported.

As previously mentioned, one end of the carrier 26 is provided with a pair of segmental girders 42 for use in erecting the rocket or missile R to a vertical position at the launch site. The segmental girders 42 are rigidly secured to the members 52 and 54 in any suitable manner and are provided with further stiffening members 64 extending on radii of the radius of curvature of the girders 42, the members 64 being secured to the truss structure to each other adjacent the upper longitudinally extending members 52. The segmental girders 42 have pockets 66 on their peripheral surface which are adapted to engage lugs 68 provided along the tread plates 44. A more detailed description of the cooperation between the pockets 66 and the lugs 68 to cause the carrier to roll about a center of roll upwardly to a vertical position will follow in more detail later in the specification.

The point of junction of the members 64 with each other and with the upper longitudinal members 56 provides a bearing housing for shafts of rotatable pinions 70. The pinions 70, which are adapted to rotate relative to the carrier on the axis of roll, that is the axis of the segmental girders 42, are driven by motors 72 suitably supported on support plates 74 carried by the upper longitudinal structural members 52.

The bottom structural members 52 have rigidly secured thereto railway type truck support plates 76 which are adapted to pivotally receive railway type trucks 39. Each of the plates 76 is provided with a hole in its lower surface for receiving the reduced end of a ram 80 of a hydraulic jack 82 carried by each railway type truck 39. The ends of the rams 82 extending into the holes 78 provide pivot bearings for the trucks 39 when the trucks are moving the carrier on the track structure back and forth from the assembly building 16 to the launch pad 34. It will be noted from reference to FIGURES 3 and 5 that each railway type truck 39 includes two or more pairs of transversely spaced flanged wheels 84. Because of the width of the carrier 26 the track structure 36 includes two or more sets of rails suitably spaced from each other to support each side of the carrier. By such an arrangement, yard engines 40 in side-by-side position on each set of rails is utilized to push or pull the carrier 26 as desired.

The hydraulic jacks 82 provided on each of the railway type trucks are utilized to elevate the frame structure of the carrier upwardly when the carrier is in the bay 18 of the assembly building 16 so that the pedestals 28 can be inserted at suitable points under the lower longitudinal members 52 and then the entire frame structure is lowered so that it is supported rigidly by the pedestals 28 during assembly of the rocket or missile rather than directly on the railway trucks 39. Also, the jacks 82 are utilized to vertically adjust the frame structure at the launch site so that the segmental girders can be mated with and engaged on tread plates 44.

As best shown in FIGURES 8 through 10 inclusive, a pair of frame members 90 extend along each side of the pit 46, the base of the frame members including a support for the tread plate 44. The frame members 90 include suitably upwardly extending standards 92 braced by side supports 94. Carried at the top of the standards 92 of each of the frame members 90 are racks 96 which cooperate with the pinions 70. As will now be evident, the carrier 26 is moved on the track structure 36 to a position where the segmental girders 42 engage the tread plate 44 and the pinions 70 engage the racks 96. The motors 72 are then energized to cause the pinions to rotate and move horizontally along the racks, thus causing the segmental girder 42 to roll the entire frame structure of the carrier with the rocket or missile R therein vertically upwardly as shown in FIGURE 9. This action is similar to that of the rolling lift type of through truss drawbridges.

As best shown in FIGURES 11 and 12, a detachable counterweight structure generally designated by the numeral 98 is provided in the pit 46 for connection to the segmental girders 42 prior to elevation of the carrier 26. In more detail, the segmental girders 42 are provided with sister hooks 100 which receive sister hook connectors 101 carried on the upper ends of the arms 102 supporting a counterweight 104. The counterweight 104 extends transversely across a pit 46 and has sufficient size and shape whereby it may serve as a flame deflector when a rocket or missile is fired from the pad 34. In addition to the sistor hook connectors 101, the two upwardly extending arms 102 are provided with a second pair of sister hook connectors 106 which are adapted to engage sister hooks 108 secured to the side walls of the pit 46 when the counterweight 104 is in the position shown in the broken lines of FIGURE 12. The sistor hook connectors 106 engage the sister hooks 108 in the side walls and fixedly support the counterweight in a position beneath the thrust support ring 48 with the upwardly extending arms 102 in a position so that the sistor hook connectors 101 on the upper end thereof are approximately in a position to receive the sister hooks on the segmental girders 42.

Hydraulic jacks 110 carried on supports 112 in the side walls of the pit 46 are adapted to engage flanges 114 on the arms 102 so that the entire counterweight structure 98 can be moved upwardly a sufficient distance to permit the sister hook connectors 101 to engage and be connected to the sister hooks 100 on the segmental girders 42 with the sister hook connectors 106 being then disconnected from the sister hooks 108 fixedly supported in the side walls. When this has been accomplished, the full counterweight structure 98 is supported by the segmental girders 42 and as the segmental girders roll on the tread plates 44, the counterweight structure 98 will move from the left to the right of FIGURE 12 free of the hydraulic jacks 110 and downwardly to counterbalance the weight of at least the cantilever portion of the truss structure on carrier 26, i.e., the portion outwardly of the center of roll.

By arranging the pinions 70 at the center of roll, relative to the position of the rocket or missile R in the carrier 26 so that they lie on a line extending approximately through the center of gravity of the rocket or missile R, it takes very little power to raise the carrier 26 with a rocket or missile R therein. The counterweight structure 98 effectively balances the cantilever portion of the truss structure of the carrier 26 and a small portion of weight of the rocket or missile R.

As shown in FIGURE 2, the carrier 26' is provided with a center of roll C extending substantially through the axis of the center of gravity of the rocket or missile R. When the center of roll is arranged in this manner rather than slightly above the axis of the center of gravity as in FIGURE 3, the counterweight structure 98 can be made even lighter as the entire weight of the rocket or missile is eliminated from counterweight consideration.

If desirable, the counterweight structure 98' may be permanently attached to the segmental girders 42', as shown in FIGURE 2.

It is possible to fabricate the structural members of the carrier 26 from a combination of aluminum and steel. The dead weight of the carrier 26 may be reduced by constructing the cantilever portion of the carrier 26 with aluminum and the segmental girder end of steel. Thus by this means the counterweight structure may be made even lighter.

When the rocket or missile R has been moved to the vertical position by the carrier 26, the support mount 48 is elevated to engage the base of the same. This is accomplished by providing cross beams (FIGURES 11 and 12) rigidly anchored in the walls of the pit 46. The cross beams 111 which may be box-shaped in cross section, are provided with hydraulic jacks 113 or the like having rams 116 extending through suitable apertures in the upper surface of the cross beams. The rams of the jacks 113 are adapted to engage the lower surface of a base frame 118 upon which the support mount 48 is mounted. The jacks 113 when operated, lift the base frame 118 upwardly off of the cross beams a sufficient distance to permit the support mount 48 to engage the base of the rocket or missile R so as to support the weight of the same as the girth rings 30 and longerons 42 are disconnected. The support mount 48 is then lowered downwardly until its base frame 118 is solidly positioned on the cross beams. The missile or rocket R is in position as shown in FIGURE 10.

Instead of using the rack 96 and pinion 70 arrangement for driving the carrier 26 upwardly and downwardly, a hydraulically driven cable and sheave system may be used such as the system schematically shown in FIGURES 13 through 16 inclusive. In more detail, a fastener 120 for cable 128 is attached to the carrier at the center of roll of the same to replace the pinion 70. A pair of sheaves 122 are fixedly carried alongside the pit 46 and a pair of movable sheaves 124 are carried on the piston rods 125 of opposed pistons 126 in a fixed cylinder 130. The sheaves 122 and 124 and the fixed sheaves 131 are preferably located in a trench alongside of the pit 46. A wire cable 128 or the like fixed at each end of the trench as indicated at 132 passes about the movable sheaves 124, the fixed sheaves 122 and 131 are fixed to the fastener 120 on the carrier 26 as shown in FIGURE 13.

When hydraulic fluid enters the fixed cylinder 130 under pressure behind the piston 126 shown in full lines at the right of FIGURE 13, the piston will be driven to the left whereas the opposed piston 126 also moves to the left as the hydraulic fluid behind the same returns to a hydraulic fluid reservoir 134. Such movement of the two pistons 126 causes the fastener 120 to move from the full line position to the dotted line position of FIGURE 13 and it will be noted that the segmental girder 42 has rotated on the tread plate 44 from the full line position to the dotted line position. The full line position of segmental girder 42 represents the carrier 26 when in a horizontal position, whereas the dotted line position of the segmental girder 42 represents the carrier having been rolled to a vertical position. The reverse movement for the segmental girders 42 is obtained by applying hydraulic fluid from the reservoir 134 under pressure behind the left-hand piston 126 whereas fluid behind the right-hand piston 126 is exhausted or returned to the source of hydraulic fluid 134.

Referring to FIGURE 14, which illustrates a schematic flow diagram for the hydraulic cylinder 130, it will be noted that the two pistons 126 are separated by a space 136 filled with air. A hydraulic fluid inlet manifold line 138 having a pump 140 therein is provided with inlet pipes 142 and 144 extending to the opposite ends of the cylinder 130. Valves 146 and 148, are provided in the inlet pipes 142 and 144, respectively. The valves 146 and 148 are alternately fully open or fully closed depending upon which end of the cylinder 130 it is desired to apply hydraulic fluid under pressure. Return lines 150 and 152 extend from the respective ends of the cylinder 130 to a manifold line 154 emptying into the hydraulic fluid reservoir 134. The lines 150 and 152 are provided with back pressure return valves 156 and 158, respectively. It will now be understood that when the pump 138 is operating, one of the inlet valves 146 or 148 on one end of the cylinder is opened whereas the inlet valve opposite the open inlet valve will be closed. The return valve, on the end of the cylinder where the inlet valve is closed, will be open whereas the other return valve is closed.

The pistons 126 are provided on their opposed faces with air vent holes 160 communicating with passages 162 leading to vent passages 164 extending through the piston rods 125 to atmosphere. The purpose of providing vents for the air space 136 between the opposed pistons 126 is twofold. First, by venting the space through the pistons, compensation can be made for expansion and contraction of air within the cylinder due to changes in temperature. Secondly, and more importantly, space 136 provides room for additional piston travel necessary to allow for the variable difference in length of rope 128 on each side of fastener 120 during movement of the carrier between the horizontal and vertical positions. When all cylinder valves are closed the carrier 26 is locked in its position and is immovable.

When the carrier 26 is moving to or from the launch pad 34, the cable 128 is removed from fastener 120 and placed in the trench. Suitable closures may be provided to cover the trench when the cable is not in use.

Referring now to FIGURE 17, the carrier may be transported to and from the launch site or pad 34 by means of two or more wide tread crawler units 170 where it is not desired to install a track system. The crawler units 170 are of the type having endless tank tread 172 and a self-contained power unit (not shown). The upper surface of each of the crawler units 170 is provided with a flat support plate 176 which is wide enough to extend completely across the width of the carrier 26. The crawler units 170 can be provided with suitable hydraulic jacks (not shown) similar to those provided on the railway type trucks 39 so that the carrier 26 may be lifted off of the crawlers and lowered on pedestals 28 inserted thereunder during the phase of the operation when the rocket or missile is assembled on the carrier.

Both the rail type trucks 39 and the crawler units 170 detachably support the carrier 26 thereon. When the carrier 26 reaches the launching pit and it is rolled to a vertical position as heretofore disclosed, the railway type trucks 39 or the crawler units 170 as the case may be are detached therefrom and remain on the ground so that there is no necessity to raise the deadweight of the same. When the carrier 26 is lowered, the trucks 39 or units 170 are repositioned therebeneath to receive and support the same.

During transportation of rockets and missiles R to the launch site, it is necessary that the rockets or missiles be grounded to prevent lightning and fault currents from damaging the same. In the situation where the railway type trucks 39 are used, the rocket or missile can be grounded through the metallic support members of the carrier 26 to the railway type truck body and then through the steel wheels of the railway type truck to the grounded rails of the track structure. On the other hand, where the crawler units 170 are used, a special grounding unit extending from the crawler units to the ground must be provided.

While the objects and advantages of the method and/or system of the present invention have been fully and effectively accomplished by the disclosures in the specification and drawing, it will be understood that the method and/or system is subject to some changes and modifications without departing from the principles and scope of the invention involved. Therefore, the terminology used in the specification is for the purposes of description and not limitation, the scope of the invention being defined in the claims.

What is claimed is:

1. A method of assembly of an elongated rocket or missile and of positioning of the same on a launch pad comprising the steps of: assembling the rocket or missile in a horizontal position from component parts on a mobile carrier at a site remote from the launch pad; moving the carrier with the assembled rocket or missile supported thereon in a horizontal position from the site of assembly to the launch pad; then rolling the carrier upwardly about one end thereof with the rocket or missile supported thereon until the rocket or missile has moved from a horizontal to a substantially vertical position; and removing the rocket or missile from the carrier onto the launch pad.

2. A method of assembly of an elongated rocket or missile and of positioning of the same on a launch pad comprising the steps of: assembling the rocket or missile in a horizontal position from component parts on a mobile carrier at a site remote from the launch pad; moving the carrier with the assembled rocket or missile supported thereon in a horizontal position from the site of assembly to the launch pad; then rolling the carrier upwardly about one end thereof with the rocket or missile supported thereon until the rocket or missile has moved from a horizontal to a vertical position; then supporting the missile on its base independently of the carrier; and then rolling the carrier downwardly and moving it away from the rocket or missile.

3. A method of assembly of an elongated rocket or missile and of positioning of the same on a launch pad comprising the steps of: assembling the rocket or missile in a horizontal position from component parts on a mobile carrier at a site remote from the launch pad; moving the carrier with the assembled rocket or missile supported thereon in a horizontal position from the site of assembly to the launch pad; then rolling the carrier upwardly about one end thereof with the rocket or missile supported thereon until the rocket or missile has moved from a horizontal to a vertical position; elevating a support mount until it engages the base of the rocket or missile and supports the same independently of the carrier; and then rolling the carrier downwardly and moving it away from the rocket or missile.

4. A method of assembly of an elongated rocket or missile and of positioning of the same on a launch pad comprising the steps of: assembling the rocket or missile in a horizontal position from component parts on a mobile carrier at a site remote from the launch pad; moving the carrier with the assembled rocket or missile supported thereon in a horizontal position from the site of assembly to the launch pad; then rolling the carrier upwardly about one end thereof on a center of roll extending through the center of gravity of the rocket or missile, the carrier being rolled upwardly until the rocket or missile moves from a horizontal to a vertical position; then releasing the rocket or missile from the carrier and supporting the same on its base; and then rolling the carrier downwardly and moving it away from the rocket or missile.

5. The method as claimed in claim 4 including the step of elevating a support mount until it engages the base of the vertically positioned rocket or missile and supports the same independently of the carrier.

6. The method as claimed in claim 4 including the step of attaching a counterweight to the carrier just prior to rolling the carrier upwardly and then detaching the counterweight from the carrier just after rolling the carrier downwardly.

7. The method as claimed in claim 6 including the further step of fixedly supporting the counterweight after detachment from the carrier in a position where the counterweight is beneath the rocket or missile and serves as a flame deflector when the same is launched.

8. The method as claimed in claim 4 including the step of grounding the rocket or missile through the carrier during movement of the carrier from the site of assembly to the launch pad.

9. The method as claimed in claim 4 including the step of checking out rocket or missile systems of the assembled rocket or missile while the same is in the horizontal position.

10. A method of transporting the elongated rockets or missiles to and erecting them on a launch pad comprising the steps of: supporting the rocket or missile in a horizontal position on a mobile carrier at a site remote from the launch pad; checking out components of the rocket or missile while in a horizontal position and while on the carrier, transporting the carrier with the rocket or missile thereon to the launch pad; rolling the carrier about one end until the rocket or missile supported thereon has moved from a horizontal to a vertical position; transferring the rocket or missile from the carrier to a support mount; and then rolling the carrier downwardly and transporting it away from the launch pad.

11. The method as claimed in claim 10 wherein the carrier is rolled on an axis extending substantially through the center of gravity of the rocket or missile.

12. The method as claimed in claim 10 including attaching a counterweight to the carrier at the launch pad prior to upward rolling of the carrier and detaching the counterweight from the carrier after the downward rolling of the carrier.

13. The method as claimed in claim 10 wherein transferring of the rocket or missile from the carrier to the support mount is accomplished by raising the thrust ring upwardly beneath the vertically positioned rocket or missile until the same is seated thereon.

14. A method of transporting elongated rockets or missiles to and erecting them on a launch pad comprising the steps of: storing fully armed and fueled rockets or missiles each in a horizontal position and each on a mobile carrier at a protected site remote from the launch pad; transporting the carriers as needed to the launch pad with the rocket or missile thereon in a horizontal position; elevating one end of the carrier by rolling the other end of the carrier about an axis of roll extending substantially through the center of gravity of the rocket or missile supported in the carrier until the rocket or missile thereon is in a substantially vertical position; then transferring the rocket or missile from the carrier to a support mount of the launch pad, lowering the carrier away from the rocket or missile and transporting the same away from the launch pad so rocket or missile can be fired.

15. The method as claimed in claim 14 including applying a weight to the end of the carrier about which the carrier is rolled to counterbalance the weight of the portion of the carrier which is elevated and then lowered.

16. The method as claimed in claim 14 including detachably applying a weight to the end of a carrier about which the carrier is rolled just prior to the elevating of the other end of the carrier and removing the weight from the carrier after the same has been lowered.

17. In a system for erecting and launching rockets or missiles from a launch pad, the combination comprising: an elongated carrier for supporting the rocket or missile in a horizontal position at a site remote from the launch pad; means for moving the carrier to the launch pad with the rocket or missile supported therein in a horizontal position; means for rolling the carrier about one end thereof at the launch pad whereby the rocket or missile is moved from a horizontal position to a vertical position; and means to transfer the rocket or missile from the carrier to the launch pad for firing.

18. In a system for erecting and launching rockets or missiles from a launch pad, the combination comprising: an elongated carrier for supporting the rocket or missile in a horizontal position at a site remote from the launch pad, said carrier being a truss structure having segmental girders rigidly attached thereto at one end thereof and means for supporting the rocket or missile therein; means for moving the carrier to the launch pad with the rocket or missile supported therein in a horizontal position; means at the launch pad for cooperating with the segmental girders to roll the carrier about the same to an upright position whereby the rocket or missile is moved from a horizontal position to a vertical position; and means to transfer the rocket or missile from the carrier to the launch pad for firing.

19. The system as claimed in claim 18 wherein said means for moving the carrier to the launch pad includes a railway type track structure extending from the site remote from the launch pad to the launch pad and railway type truck carriers on said rail structure and detachably supporting said carrier.

20. The system as claimed in claim 18 wherein said means for moving the carrier to the launch pad includes a plurality of crawler vehicles positioned beneath and supporting the carrier.

21. In the system as claimed in claim 18 wherein said means at the launch pad for cooperating with the segmental girders of the carrier include horizontally extending tread plates having lugs therein for engaging pockets on the segmental girders, said carrier having rotatable pinions positioned at the axis of the roll of said segmental girders, and a rack cooperating with said pinions; means for rotating said pinions to cause said carrier to move forward and to rotate upwardly on said segmental girders when said segmental girders are engaging said tread plates.

22. In the system as claimed in claim 18 wherein said means at the launch pad for cooperating with the segmental girders of the carrier include horizontally extending tread plates having lugs therein for engaging pockets on the segmental girders; and means to move said carrier forward when said segmental girders are engaging said tread plates whereby the carrier is rotated upwardly on the segmental girders, said last-mentioned means including a movable fastener carried by said carrier on its axis of roll on said segmental girders, a pair of spaced sheaves fixedly supported at the launch pad, a pair of movable sheaves movable on both sides of said movable fastener, a cable fixed at each end and passing about the movable sheaves, fixed sheaves and attached to the fastener on said carrier, a fixed cylinder having opposed spaced pistons operatively connected to the respective movable sheaves, and means for applying fluid under pressure selectively to the pistons.

23. In the system as claimed in claim 18 wherein said carrier has an axis of roll on said segmental girders extending through the center of gravity of a rocket or missile supported therein.

24. In the system as claimed in claim 18 including counterweight means for said carrier when said carrier is being rolled on said segmental girders.

25. In the system as claimed in claim 24 wherein said counterweight means includes weight elements fixedly attached to said carrier.

26. In the system as claimed in claim 24 wherein said counterweight means includes a counterweight element detachably connected to the segmental girders of said carrier prior to erection of the rocket or missile, said counterweight element being detached from said carrier after the rocket or missile has been erected to a vertical position and fixed to the launch pad beneath the missile whereby it serves as a flame deflector for the rocket or missile when the said is fired.

27. In the system as claimed in claim 18 wherein said means for transferring the rocket or missile from the carrier to the launch pad includes means detachably supporting the rocket or missile in the carrier and a support mount carried by the launch pad, said support mount being vertically movable upwardly to engage the base of the rocket or missile when the same is moved to a vertical position and said detachable means are released.

28. In a system for assembling rockets or missiles from component parts at a remote site and erecting rockets or missiles for launching from a launch pad, the combination comprising: an elongated carrier, said carrier being a truss structure having segmental girders rigidly attached thereto at one end thereof, and having means for supporting the rocket or missile therein in a horizontal position as the rocket or missile is being assembled; pedestals positioned beneath a carrier for supporting the carrier in a stationary position as the rocket or missile is being assembled; means for moving the carrier to the launch pad with the assembled rocket or missile supported therein in a horizontal position, said last-mentioned moving means including means to raise the carrier off of said pedestal; means at the launch pad for cooperating with the segmental girders to roll the carrier about the same to an upright position whereby the rocket or missile is moved from a horizontal position to a vertical position; and means to transfer the rocket or missile from the carrier to the launching pad for firing.

29. The system as claimed in claim 28 in which said means for supporting the rocket and missile in a horizontal position as it is assembled in said carrier includes the plurality of transversely extending support members provided in said carrier and each having upwardly facing open rocket or missile-receiving cutout therein.

30. The system as claimed in claim 29 including girth rings detachably holding the rocket or missile in the cutouts of the support members of said carrier when the carrier is being rolled to an upright position.

31. In combination: an elongated truss structure, said truss structure having segmental girders on one end thereof about which the same may be rolled between a substantially horizontal position and an upward position; horizontally extending fixed tread plates, said segmental girders cooperating with said tread plates when said truss structure is rolled about a center of roll; and means to cause said truss structure to roll upwardly and downwardly on said segmental girders, said last-mentioned means including a movable fastener carried by said truss structure on its axis of roll, a pair of spaced sheaves fixedly supported relative to said tread plates, a pair of movable sheaves movable on both sides of said movable fastener, cable means fixed at each end and passing about the movable sheaves, fixed sheaves and attached to the fastener on said truss structure, a fixed cylinder having opposed spaced pistons operatively connected to the respectively movable sheaves and means for applying fluid under pressure selectively to the pistons of said fixed cylinder.

32. The combination as claimed in claim 31 including means to vent the space between said opposed pistons to atmosphere.

33. The combination of claim 32 wherein said means to vent the space between said opposed pistons to atmosphere includes a passageway extending through at least one of said pistons and having one end open to the space between said pistons and another end open to atmosphere.

References Cited by the Examiner
UNITED STATES PATENTS

| | | | |
|---|---|---|---|
| 2,968,410 | 1/1961 | Hamilton et al. | 89—1.7 X |
| 2,981,152 | 4/1961 | Miller et al. | 214—1 X |

CHARLIE T. MOON, *Primary Examiner.*